(12) United States Patent
Nakamura

(10) Patent No.: US 9,360,823 B2
(45) Date of Patent: *Jun. 7, 2016

(54) IMAGE FORMING APPARATUS HAVING COMMUNICATION BOARD FOR NEAR FIELD COMMUNICATION

(71) Applicant: Brother Kogyo Kabushiki Kaisha, Nagoya-shi, Aichi-ken (JP)

(72) Inventor: Mitsuru Nakamura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/824,199

(22) Filed: Aug. 12, 2015

(65) Prior Publication Data

US 2015/0346672 A1 Dec. 3, 2015

Related U.S. Application Data

(63) Continuation of application No. 14/039,747, filed on Sep. 27, 2013, now Pat. No. 9,116,490.

(30) Foreign Application Priority Data

Nov. 9, 2012 (JP) ................................ 2012-247461

(51) Int. Cl.
*B41J 29/13* (2006.01)
*G03G 15/00* (2006.01)
*B41J 13/10* (2006.01)
*B41J 2/14* (2006.01)
(Continued)

(52) U.S. Cl.
CPC ............. *G03G 15/80* (2013.01); *B41J 2/14072*
(2013.01); *B41J 13/103* (2013.01); *G03G 15/5075* (2013.01); *G03G 21/1657* (2013.01); *H04N 1/00281* (2013.01)

(58) Field of Classification Search
CPC .... B41J 2/14072; B41J 2/17526; B41J 3/103; G03G 15/50; G03G 15/5075; G03G 21/1657
See application file for complete search history.

(56) References Cited

U.S. PATENT DOCUMENTS

| 5,765,093 A | 6/1998 | Funato |
| 7,612,791 B2 | 11/2009 | Sugimoto |
| 7,871,140 B2 | 1/2011 | Ohama et al. |

(Continued)

FOREIGN PATENT DOCUMENTS

| CN | 201928324 U | 8/2011 |
| EP | 1182520 A2 | 2/2002 |

(Continued)

OTHER PUBLICATIONS

Co Pending U.S. Appl. No. 13/852,795, filed Mar. 28, 2013.

(Continued)

*Primary Examiner* — Juanita D Jackson
(74) *Attorney, Agent, or Firm* — Banner & Witcoff, Ltd.

(57) ABSTRACT

An image forming apparatus includes: an image forming unit; a housing configured to store the image forming unit, the housing including an outer peripheral wall; a power supply unit disposed inside the housing; and a near field communication board including an antenna for near field communication, the near field communication board being disposed at a position of the outer peripheral wall apart from the power supply unit by a communicable distance or more.

3 Claims, 9 Drawing Sheets

(51) Int. Cl.
   *H04N 1/00*   (2006.01)
   *G03G 21/16*  (2006.01)

(56) References Cited

U.S. PATENT DOCUMENTS

| | | | |
|---|---|---|---|
| 8,064,902 B2 | 11/2011 | Kunii | |
| 9,116,490 B2 * | 8/2015 | Nakamura | G03G 15/5075 |
| 2005/0206667 A1 | 9/2005 | Ohama et al. | |
| 2007/0014620 A1 | 1/2007 | Sugimoto | |
| 2008/0204801 A1 | 8/2008 | Kunii | |
| 2008/0291283 A1 | 11/2008 | Achiwa et al. | |
| 2009/0184817 A1 | 7/2009 | Ishizuka | |
| 2010/0277763 A1 | 11/2010 | Aoyama et al. | |
| 2012/0262749 A1 | 10/2012 | Yamamoto | |
| 2013/0286433 A1 | 10/2013 | Matsushima et al. | |
| 2014/0132652 A1 | 5/2014 | Nakamura | |

FOREIGN PATENT DOCUMENTS

| | | | |
|---|---|---|---|
| JP | 2002-225390 A | 8/2002 |
| JP | 2004-330595 A | 11/2004 |
| JP | 2005-227712 A | 8/2005 |
| JP | 2005-354300 A | 12/2005 |
| JP | 2007-021767 A | 2/2007 |
| JP | 2007-081509 A | 3/2007 |
| JP | 2008-123476 A | 5/2008 |
| JP | 2008-219199 A | 9/2008 |
| JP | 2010-023526 A | 2/2010 |
| JP | 2011-103572 A | 5/2011 |
| JP | 2013-228540 A | 11/2013 |

OTHER PUBLICATIONS

Aug. 28, 2014—(US) Non-Final Office Action—U.S. Appl. No. 13/852,795.
Jan. 13, 2015—(US) Final Office Action—U.S. Appl. No. 13/852,795.
Mar. 12, 2015—(US) Application as filed—U.S. Appl. No. 14/645,530.
May 8, 2015—(EP) Extended Search Report—App 13161645.0.
Sep. 30, 2015—(CN) The Second Office Action—App 201310146433.3, Eng Tran.
Sep. 22, 2015—(US)—Non-Final Office Action—U.S. Appl. No. 13/852,795.
Dec. 3, 2015—(CN) Notification of First Office Action—App 201310450047.3, Eng Tran.
Jan. 6, 2016—(CN) The Third Office Action—App 201310146433.3, Eng Tran.
Mar. 8, 2016—(JP) Office Action—App 2012-247461, Eng Tran.

* cited by examiner

[LEFT] ←— WIDTH DIRECTION —→ [RIGHT]

IMAGE FORMING APPARATUS HAVING COMMUNICATION BOARD FOR NEAR FIELD COMMUNICATION

CROSS-REFERENCE TO RELATED APPLICATION

This application is a continuation of prior U.S. application Ser. No. 14/039,747, filed Sep. 27, 2013, now issued U.S. Pat. No. 9,116,490, which is based upon and claims the benefit of priority of Japanese Patent Application No. 2012-247461 filed on Nov. 9, 2012, the contents of which are incorporated herein by reference in its entirety.

BACKGROUND

The present disclosure relates to an image forming apparatus having a communication board for near field communication.

For example, in a related image forming apparatus, near field communication between the image forming apparatus and a communication terminal is possible.

SUMMARY

However, if the position of a communication board for near field communication is inappropriate, there is a problem in which a magnetic field of the communication board weakens due to metal components such as a power supply, and communication performance deteriorates. If the position of the communication board is inappropriate, it is feared that operability will be degraded.

In view of the above described point, an object of an aspect of the present disclosure is to provide an image forming apparatus which is excellent in operability and suppresses deterioration of communication performance of a near field communication board for near field communication.

The aspect of the present disclosure provides the following arrangements:

An image forming apparatus comprising:
an image forming unit;
a housing configured to store the image forming unit, the housing including an outer peripheral wall;
a power supply unit disposed inside the housing; and
a near field communication board including an antenna for near field communication, the near field communication board being disposed at a position of the outer peripheral wall apart from the power supply unit by a communicable distance or more.

DESCRIPTION OF EXEMPLARY EMBODIMENTS

<First Embodiment>

A first embodiment of the present disclosure will be described with reference to FIGS. 1 to 5.

Figure 1:
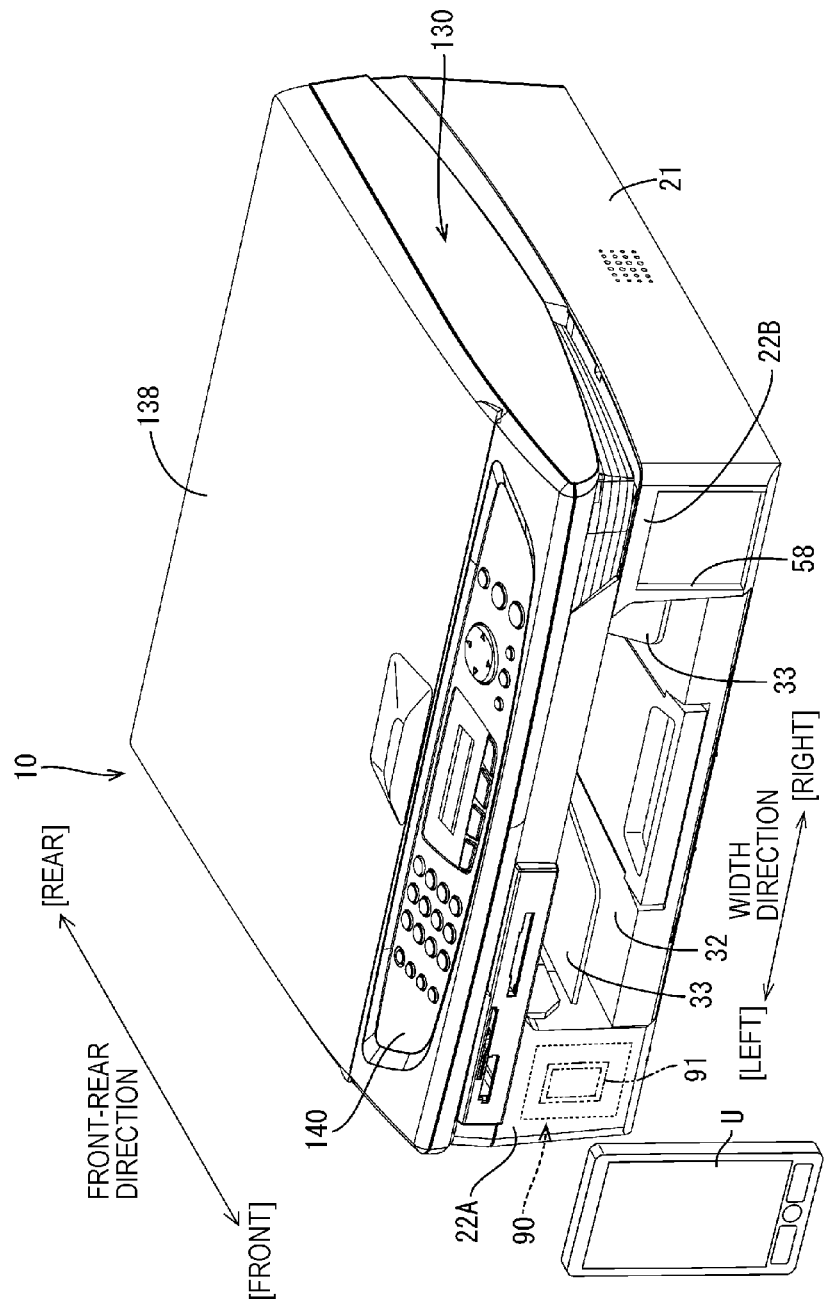
FIG. 1 is a perspective view illustrating a multi-function apparatus according to a first embodiment.
Figure 2:
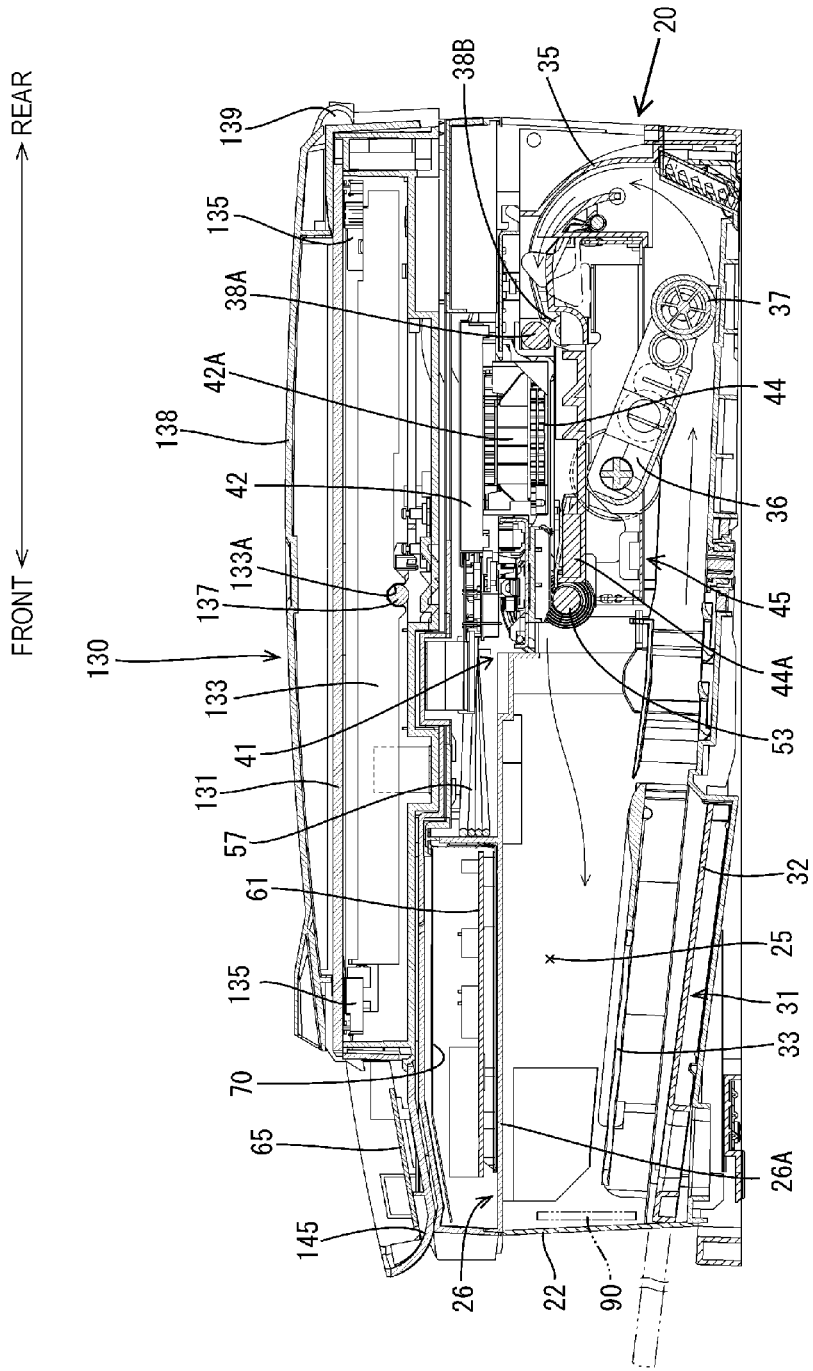
FIG. 2 is a vertical cross-sectional view illustrating the multi-function apparatus.

FIG. 1 is a perspective view illustrating a multi-function apparatus 10 according to the present embodiment. FIG. 2 is a vertical cross-sectional view illustrating the multi-function apparatus. The multi-function apparatus 10 has not only a facsimile function but also a telephone function, and further has a scanner function and a printer function based on connection with a personal computer or the like. In the following description, a direction toward a viewer of FIG. 1 (the front side of the multi-function apparatus 10) is referred to as the front side. Further, a left-right direction indicates a left-right direction as the multi-function apparatus 10 is seen from the front (see FIG. 1).

As shown in FIG. 1, the multi-function apparatus 10 includes a main body case (corresponding to a housing of the present disclosure) 21 that has almost a box shape (a box shape in which the top and the central portion of the front wall are open) and stores units constituting a printer unit 20 (shown in FIG. 3) inside, and a flatbed type scanner unit (corresponding to an image reading unit of the present disclosure) 130 that is disposed on the upper side of the main body case 21. On the front side of the scanner unit 130, an operation panel 140 which has keys and a touch panel for operation, and is for performing a variety of operation such as input operation of a telephone number is disposed.

As shown in FIG. 2, the scanner unit 130 mainly includes platen glass 131, a reading unit (corresponding to a reading unit of the present disclosure) 133, sliders 135, a scanner motor M2 (see FIG. 5), and a document cover (an example of an outer peripheral wall of the housing of the present disclosure) 138. The platen glass 131 on which a document is mounted forms a horizontal plate shape, and on the top of the platen glass 131, it is possible to mount a document. The document cover (an example of a top cover of the present disclosure) 138 can rotate upward and downward on hinges 139 provided on the upper side of a rear portion of the scanner unit 130. The document cover 138 rotates on the hinges 139, thereby capable of being displaced between a closing posture to cover the platen glass 131 and an opening posture to open the platen glass 131.

The reading unit 133 is a reading sensor such as a contactless image sensor, and is disposed on the lower surface side of the platen glass 131. The reading unit 133 is supported by a guide shaft 137 for guiding a sliding operation of the reading unit 133, and is pressed against the lower surface of the document cover 138 through a pair of left and right sliders 135 by elastic bodies such as springs (not shown). The guide shaft 137 extends along the width direction of the multi-function apparatus 10, and is fit into a fitting groove 133A formed downward at a lower portion of the center of the reading unit 133. Therefore, the reading unit 133 can use the scanner motor M2 as a power source to slide in the width direction of the multi-function apparatus 10, that is, in the left-right direction of FIG. 1.

From the above, the platen glass 131 is opened, and a document is mounted on the platen glass 131, and the platen glass 131 is closed. Then, the scanner motor M2 is driven, whereby the reading unit 133 is moved in the left-right direction of the multi-function apparatus 10. In this way, it is possible to read the image of the document.

Subsequently, the printer unit 20 will be described. The printer unit 20 of the present embodiment is an inkjet type, and roughly includes a recording unit (corresponding to the image forming unit of the present disclosure) 41 for recording images onto recording sheets, a feeding unit 31 for feeding recording sheets to the recording unit 41, a main board (an example of a control board of the present disclosure) 61, and a power supply unit 100 (see FIGS. 4 and 5).

First, the feeding unit 31 will be described. As shown in FIGS. 1 and 2, at a lower portion of the center of the main body case 21, a tray storing unit 25 is provided to pass through the main body case 21 in the front-rear direction, and a feeding tray 32 is removably fit from the front side into the tray storing unit 25. The feeding tray 32 is made of a synthetic resin and forms a plate shape, and from the left and right edge portions of the front side of the feeding tray 32, guide pieces 33 are provided to form arch shapes and cover the top of recording sheets set on the tray. The guide pieces 33 have a positioning function relating to the left-right direction of recording sheets, and a function as a discharging tray.

As shown in FIG. 2, on the rear surface side of the tray storing unit 25, a plate 35 for a U-turn which forms an arc shape is mounted. Meanwhile, on an engine frame 45 (to be described below), a feeding roller 37 is pivotally supported to hang down through an arm 36. The feeding roller 37 is configured to be connected to a main motor M1 (see FIGS. 4 and 5) serving as a driving source through a connecting shaft (not shown), and abut on the top of recording sheets mounted on the feeding tray 32.

Therefore, if the main motor M1 (see FIGS. 4 and 5) drives the feeding roller 37, the recording sheets are sent one by one from the front side to the rear side of the printer unit 20 (in an rear direction shown in FIG. 2) by the feeding tray 32. Then, each sent recording sheet passes the plate 35 for a U-turn from the lower side to the upper side, thereby being inverted 180 degrees. Thereafter, each inverted recording sheet is sent to the front side, that is, the recording unit 41 by a resist roller 38A disposed in front of the plate 35 for a U-turn and a driven roller 38B rotating in association with the resist roller 38A.

Figure 3:
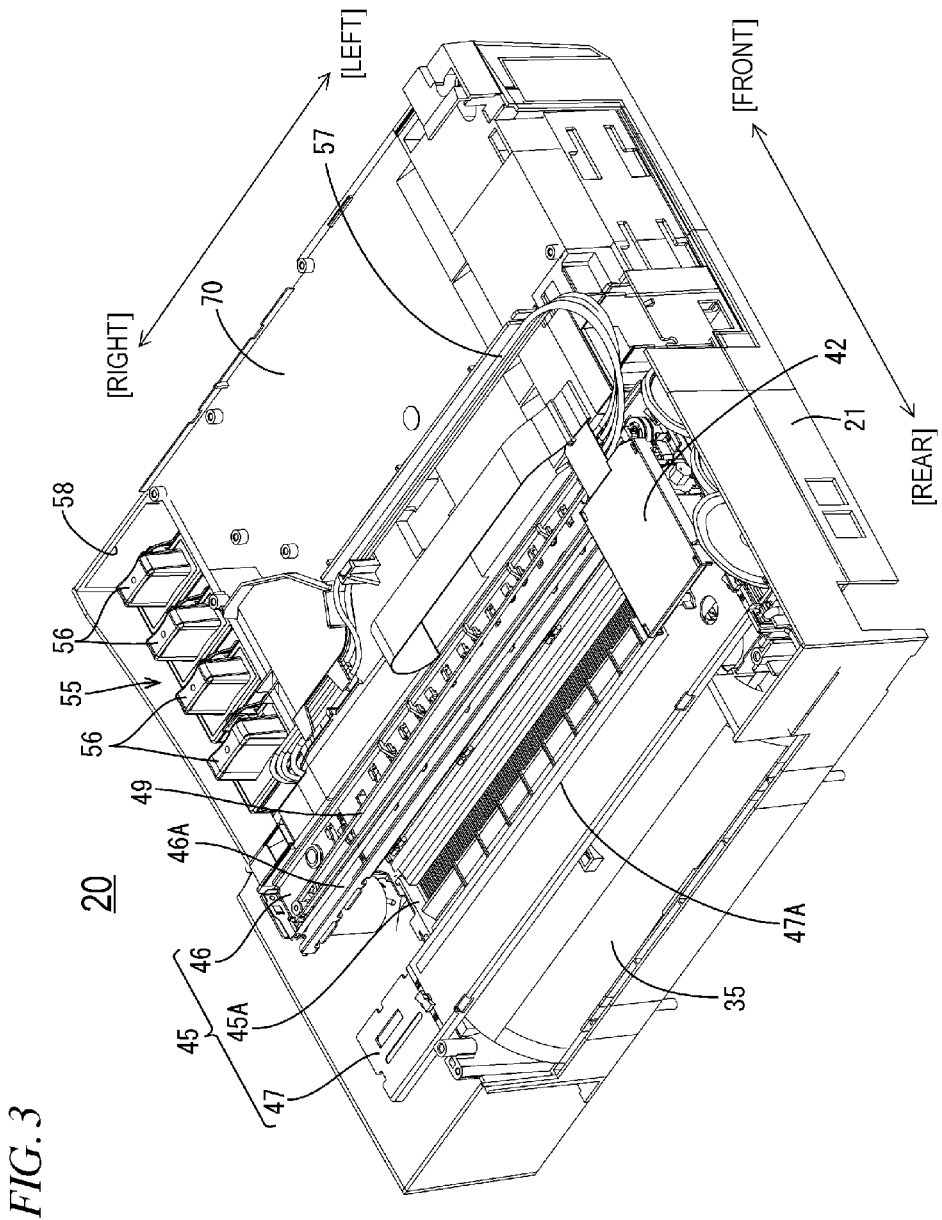
FIG. 3 is a perspective view illustrating a printer unit as seen from the rear side.

As shown in FIGS. 2 and 3, the recording unit 41 mainly includes a carriage 42 having a recording head 42A, a platen 44, a timing belt 49 connected to the main motor M1, and the engine frame 45 for supporting them. The engine frame 45 is disposed on the feeding tray 32 on the rear side of the main body case 21. The engine frame 45 is made of a metal, and as shown in FIG. 3, on the upper side of a main body portion 45A forming a box shape, a pair of guide rails 46 and 47 is mounted to extend in the left-right direction of the main body case 21. On the main body portion 45A, the arm 36 of the feeding roller 37 is pivotally and rotatably supported, and the platen 44 and waste liquid foam 44A are mounted.

Both of the guide rails 46 and 47 are made of a metal and are disposed in parallel in the front-rear direction. The carriage 42 is disposed in the front-rear direction between the two guide rails 46 and 47. In this installation state, sliding protrusions (not shown) formed on the carriage 42 abut on a rear portion of the front guide rail 46 and a front portion of the rear guide rail 47 (hereinafter, referred to sliding portions 46A and 47A), respectively. If the main motor M1 and the timing belt 49 are driven, the sliding protrusions slide along the sliding portions 46A and 47A, respectively, and the carriage 42 reciprocates along the left-right direction of the printer unit 20. Therefore, it is possible to use the recording head 42A to record images on recording sheets sent to the recording unit 41 through the feeding unit 31.

As shown in FIG. 2, at the central portion of the tray storing unit 25, on the front side of the engine frame 45, a discharging roller 53 is provided. This discharging roller 53 is connected to the main motor M1 through a linking means (not shown), and discharges recording sheets having images recorded thereon onto the guide pieces 33.

As shown in FIG. 3, on the left side of the front side of the main body case 21 (the rear left side in FIG. 3), a cartridge storing unit 55 is provided. In the cartridge storing unit 55, ink cartridges 56 corresponding to four colors are stored in parallel in the front-rear direction. The ink cartridges 56 and the recording head 42A (see FIG. 3) are connected by liquid transfer tubes 57, such that if ink is ejected from the recording head 42A, the ink is fed from the ink cartridges 56 to the recording head 42A.

Further, as shown in FIG. 1, at a right end portion 22B of a front wall 22 of the main body case 21, an installation/removal opening 58 for installing or removing the ink cartridges 56 is formed, such that it is possible to install or remove each ink cartridge 56 through the installation/removal opening 58.

In the multi-function apparatus 10, at a left end portion 22A of the front wall 22 of the main body case 21 which is on the opposite side to the installation/removal opening 58, an NFC board (to be described below in detail) 90 is mounted. Therefore, when the ink cartridges 56 are installed or removed, the NFC board 90 does not become a hindrance.

At a position above the feeding unit 31 on the front side of the main body case 21, a first board storing unit 26 (see FIG. 2) is provided. The first board storing unit 26 has a shallow box shape opened upward, and in the first board storing unit 26, the main board 61 for electrically controlling driving of each unit such as the recording head 42A is disposed. The main board 61 forms a horizontally long shape long in the left-right direction, and the top of the main board 61 is covered by a shield case 70 made of a metal. The main board 61 is generally within a height range where the carriage 42 and the recording head 42A constituting the recording unit 41 are provided. If the main board 61 and the recording unit 41 are disposed in parallel within the same height range as described above, it is possible to reduce the height of the apparatus, as compared to a case where the main board 61 and the recording unit 41 are stacked in a vertical direction.

Figure 4:
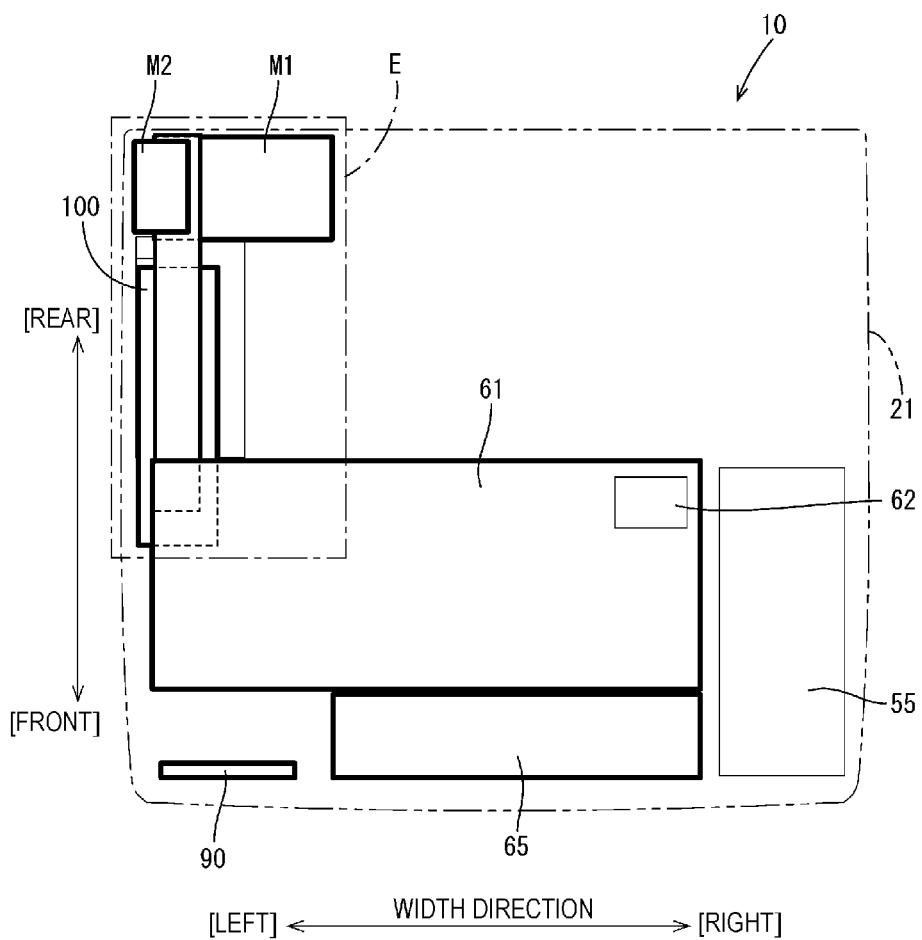
FIG. 4 is a plan view illustrating the positional relationships between an NFC board and metal components.

On the main board 61, as shown in FIG. 4, a communication board 62 for a wireless local area network (LAN) is mounted. The communication board 62 for a wireless LAN is configured to have a linear antenna (not shown) for wireless LAN connection, and a communication circuit (not shown). The communication board 62 for a wireless LAN performs wireless LAN communication with a communication terminal U such as a portable phone or a smart phone. In the present embodiment, the communication board 62 for a wireless LAN is disposed on the right side of a rear portion of the main board 61, such that a distance to the NFC board 90 (to be described below) is ensured to prevent an electric wave of the communication board 62 for a wireless LAN and an electric wave of the NFC board 90 from interfering with each other.

As shown in FIG. 2, on the front side of the scanner unit 130, a second board storing unit 145 is provided, and in the second board storing unit 145, an operation board 65 is stored. The main board 61 and the operation board 65 are electrically connected by an electric wire (not shown).

As shown in FIGS. 1, 2, 4, and 5, on the rear surface side of the left end portion 22A of the front wall (an example of the outer peripheral wall of the housing of the present disclosure) 22 of the main body case 21, the NFC board (an example of a near field communication board of the present disclosure) 90 is mounted. Specifically, on the rear surface of the front wall 22, the NFC board 90 is mounted by a hook or a screw formed integrally with the NFC board 90. The NFC board 90 is for performing near field communication with the communication terminal U, and is configured to have a loop antenna 91 and a communication circuit (not shown). The NFC (Near Field Communication) means to perform wireless communication within a range whose maximum is about 1 m. Further, the frequency of the NFC is 13.56 MHz.

The communicable distance of the loop antenna 91 mounted on the NFC board 90 is almost the same as the diameter of the loop antenna 91. In the present embodiment, the loop antenna 91 is rectangular, and has a diameter (the length of a diagonal line) of 50 mm. Therefore, the communicable distance of the NFC board 90 is almost 50 mm.

Since the communicable distance of the NFC is short, in order to perform communication between the communication terminal U and the multi-function apparatus 10, it is necessary to bring the communication terminal U close to the multi-function apparatus 10 such that a distance therebetween becomes the communicable distance or less. In this respect, in the multi-function apparatus 10, the NFC board 90 is mounted on the front wall 22 of the main body case 21, and if the communication terminal U is brought from the front side of the multi-function apparatus 10 close to the multi-function apparatus 10, it is possible to make the distance between the communication terminal U and the multi-function apparatus 10 equal to or less than the communicable distance. Therefore, the operability is good. Besides, since the NFC board 90 is disposed on the left side of the front wall 22 (the left side as the multi-function apparatus 10 is seen from the front), it is possible to operate the operation panel 140 with a right hand while brining the communication terminal U close to the NFC board 90 of the multi-function apparatus 10 with a left hand, and thus the operability is good.

The NFC is used for pairing with the communication terminal U or establishing an interconnection with the communication terminal U by a wireless LAN.

Figure 5:
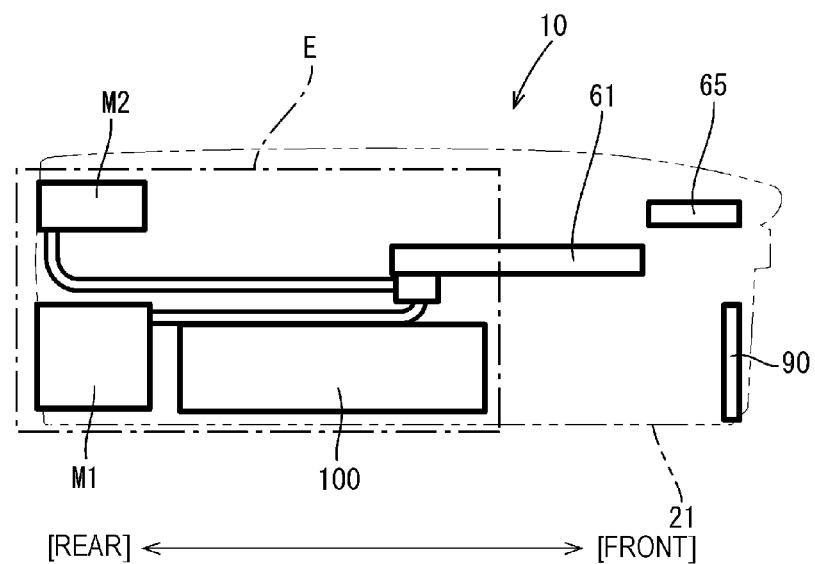
FIG. 5 is a vertical cross-sectional view illustrating the positional relationships between the NFC board and the metal components.

In the multi-function apparatus 10, as shown in FIGS. 4 and 5, on the left side of the rear portion of the main body case 21, the power supply unit 100, the main motor M1, and the scanner motor M2 are disposed. Specifically, on the left side of the rear end of the bottom of the main body case 21, the main motor M1 is disposed. Further, in front of the main motor M1, the power supply unit 100 is disposed.

The power supply unit 100 is configured by storing a power supply board with a power supply circuit mounted thereon inside a protective cover made of a metal, and generates DC 5 V which is used as power for a memory and the like, and DC 30 V for operating actuators such as the motors M1 and M2. The power supply unit 100 and each board 61 or 65 are connected by an electric wire, and the power supply unit 100 and each motor M1 or M2 are connected by an electric wire, and the voltages generated by the power supply unit 100 are applied to the main board 61, the operation board 65, and the motors M1 and M2.

Similarly to the main motor M1, the power supply unit 100 is disposed on the left side of the bottom of the main body case 21. The power supply unit 100 has a shape long in the front-rear direction, and is disposed on the rear side of the main body case 21, in parallel with the main motor M1 in the front-rear direction, and the front end of the power supply unit 100 is positioned almost at the center of the main body case 21. Above the main motor M1, the scanner motor M2 is disposed. Similarly to the power supply unit 100 and the main motor M1, the scanner motor M2 is also disposed on the left side of the main body case 21.

The power supply unit 100, the main motor M1, and the scanner motor M2 are generally disposed close to one another, and are gathered on the left side of the rear portion of the main body case 21.

As described above, in the multi-function apparatus 10, the NFC board 90 is disposed on the front side of the main body case 21, whereas metal components (components having metals likely to let a magnetic flux pass at their parts) E such as the power supply unit 100 and the motors M1 and M2 are disposed on the rear side of the main body case 21. That is, the NFC board 90 and the metal components E are disposed separately from each other in the front-rear direction, such that the board end is separated from the metal components E by the communicable distance or more (specifically, 50 mm or more). For this reason, a magnetic flux generated by a current flowing in the loop antenna 91 mounted on the NFC board 90 does not interlink with the power supply unit 100 and the motors M1 and M2. Therefore, the leakage of the magnetic flux is small, and a magnetic field generated by the loop antenna 91 does not weaken. Therefore, it is possible to suppress the communication performance of the NFC board 90 from deteriorating.

The NFC board 90 and the metal components E such as the power supply unit 100 and the motors M1 and M2 need only to be separated from each other at least by the communicable distance or more. However, it is preferable to set a margin of several millimeters for the communicable distance and separate the NFC board 90 from the metal components by the corresponding distance such that the leakage of the magnetic flux further decreases.

Since the metal components E such as the power supply unit 100, the main motor M1, and the scanner motor M2 are noise sources E, if the metal components E are separated from the NFC board 90 as far as possible, the NFC board 90 becomes unlikely to be influenced by noise. In this respect, in the multi-function apparatus 10, the NFC board 90 and the noise sources E are disposed separately from each other in the front-rear direction. Therefore, it is possible to ensure distances (long distances) from the NFC board 90 to the noise sources E, and the NFC board 90 becomes unlikely to be influenced by noise.

As shown in FIG. 2, the NFC board 90 is disposed at a position of the front wall 22 of the main body case 21 lower than the first board storing unit 26 for storing the main board 61. As a result, it becomes possible to vertically partition a space between the main board 61 and the NFC board 90 by a bottom wall 26A of the first board storing unit 26, and at the same time, it is possible to separate the NFC board 90 and the main board 61 from each other in the vertical direction. It is also possible to separate the NFC board 90 from the shield case 70 covering the main board 61 in the vertical direction.

In the multi-function apparatus 10, the NFC board 90 is disposed to deviate downward with respect to the main board 61, such that the board end is separated from the main board 61 and the shield case 70 by the communicable distance or more. For this reason, a magnetic flux generated by a current flowing in the loop antenna 91 mounted on the NFC board 90 does not interlink not only with the power supply unit 100 and the motors M1 and M2 but also with the main board 61 and the shield case 70. Therefore, the leakage of the magnetic flux is small, and a magnetic field generated by the loop antenna 91 does not weaken. As a result, it is possible to further suppress the communication performance of the NFC board 90 from deteriorating. If metal components other than the power supply unit 100, the motors M1 and M2, and the main board 61 are also separated from the NFC board 90 by the communicable distance or more, it is possible to further suppress the communication performance of the NFC board 90 from deteriorating. In the present embodiment, the engine frame 45 made of a metal is disposed on the rear side of the main body case 21 such that the engine frame 45 is separated from the NFC board 90 by the communicable distance or more.

<Second Embodiment>

Subsequently, a second embodiment of the present disclosure will be described with reference to FIGS. 6 to 8.

In the first embodiment, the metal components (noise sources) E are disposed on the rear side of the main body case 21, whereas the NFC board 90 is mounted on the front wall 22 of the main body case 21. That is, the metal components E and the NFC board 90 are disposed to be apart from each other in the front-rear direction. The metal components E and the NFC board 90 need only to be disposed apart from each other at least by the communicable distance or more, and the metal components E and the NFC board 90 may be disposed separately from each other in the left-right direction or vertical direction of the main body case 21.

Figure 7:
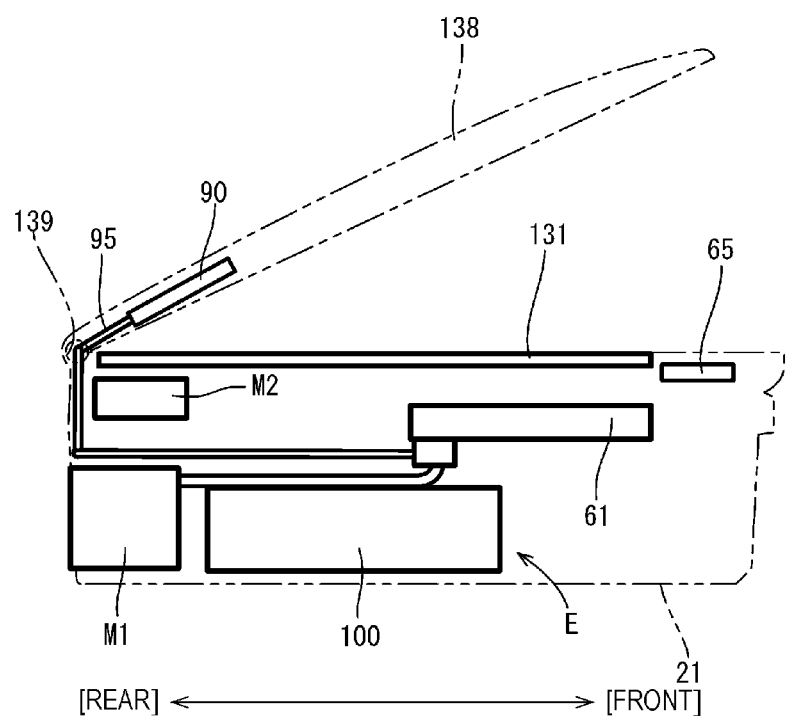
FIG. 7 is a vertical cross-sectional view illustrating the multi-function apparatus according to the second embodiment.

In the second embodiment, as shown in FIG. 7, the metal components E are disposed on the left side of the apparatus (the left side of the main body case 21), and the NFC board 90 is disposed on the right side of the apparatus (the right side of the document cover 138), such that the metal components E and the NFC board 90 are separated from each other in the left-right direction. In the second embodiment, the NFC board 90 is disposed on the rear surface of the document cover 138, and the metal components (particularly, the power supply unit 100 and the main motor M1) E are disposed on the bottom side of the main body case 21. For this reason, it is possible to separate the NFC board 90 and the metal components E even in the vertical direction. Therefore, it becomes possible to surely separate the metal components E and the NFC board 90 by the communicable distance of 50 mm or more, and it is possible to suppress the communication performance of the NFC board 90 from deteriorating.

Figure 8:
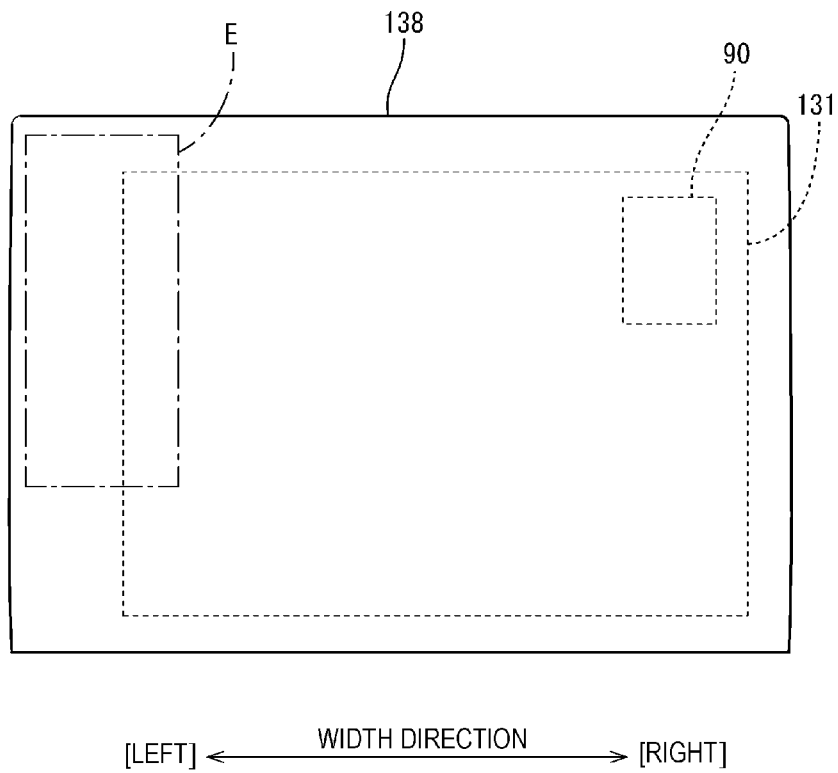
FIG. 8 is a plan view illustrating the positional relationships between an NFC board and metal components.

As shown in FIG. 8, the NFC board 90 is disposed to overlap the platen glass 131 as the multi-function apparatus 10 is seen from the above (a direction perpendicular to the platen glass 131). In the present embodiment, the platen glass 131 and the NFC board 90 have a positional relationship in which the entire NFC board 90 overlaps the platen glass 131. Immediately below the platen glass 131, a space for moving the carriage 42 is necessary. For this reason, the metal components E such as the power supply unit 100, the main motor M1, and the scanner motor M2 are disposed so as not to be immediately below the platen glass 131. Therefore, if the NFC board 90 is disposed to overlap the platen glass 131, it becomes possible to surely separate the NFC board 90 from the metal components E such as the power supply unit 100, the main motor M1, and the scanner motor M2 by the communicable distance or more. Besides, since the platen glass 131 is interposed between the NFC board 90 and the noise sources E, there are merits in which it becomes possible to attenuate noise from the noise sources E such as the power supply unit 100, the main motor M1, and the scanner motor M2 by the platen glass 131, and the NFC board 90 is unlikely to be influenced by noise.

In a case where the NFC board 90 is disposed on the rear surface of the platen glass 131, if the communication terminal U is brought from the above of the multi-function apparatus 10 close to the multi-function apparatus 10, it is possible to make the distance between the communication terminal U and the multi-function apparatus 10 equal to or less than the communicable distance. Therefore, the operability is good.

Figure 6:
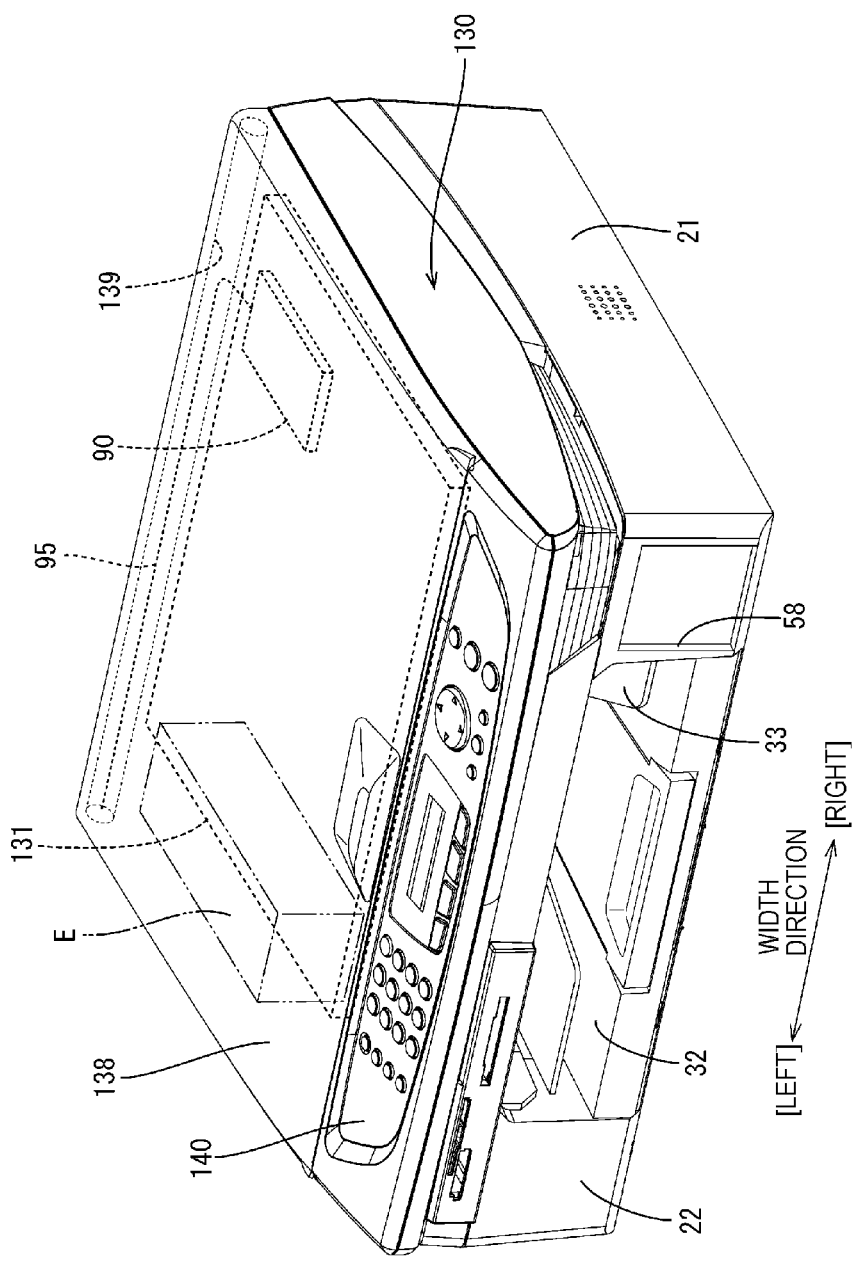
FIG. 6 is a perspective view illustrating a multi-function apparatus according to a second embodiment.

In the case where the NFC board 90 is disposed on the rear surface of the platen glass 131, it is preferable to dispose an electric wire 95 for connecting the NFC board 90 and the main board 61 through the hinges 139 of the document cover 138 as shown in FIG. 6. Passing the electric wire 95 through the hinges 139 makes it possible to suppress an excessive force from being applied to the electric wire 95 with opening and closing of the document cover 138.

<Other Embodiments>

The present invention is not limited to the embodiments described above with reference to the drawings. For example, the following embodiments also fall within the technical scope of the invention.

(1) In the first and second embodiments, as an image forming apparatus, the multi-function apparatus has been exemplified. However, it is not necessarily needed to provide the scanner unit 130, and at least only the printer unit 20 may be provided. In the first and second embodiments, as the printer unit 20, an inkjet type printer has been exemplified. However, an electrophotographic type printer may be used.

Figure 9:
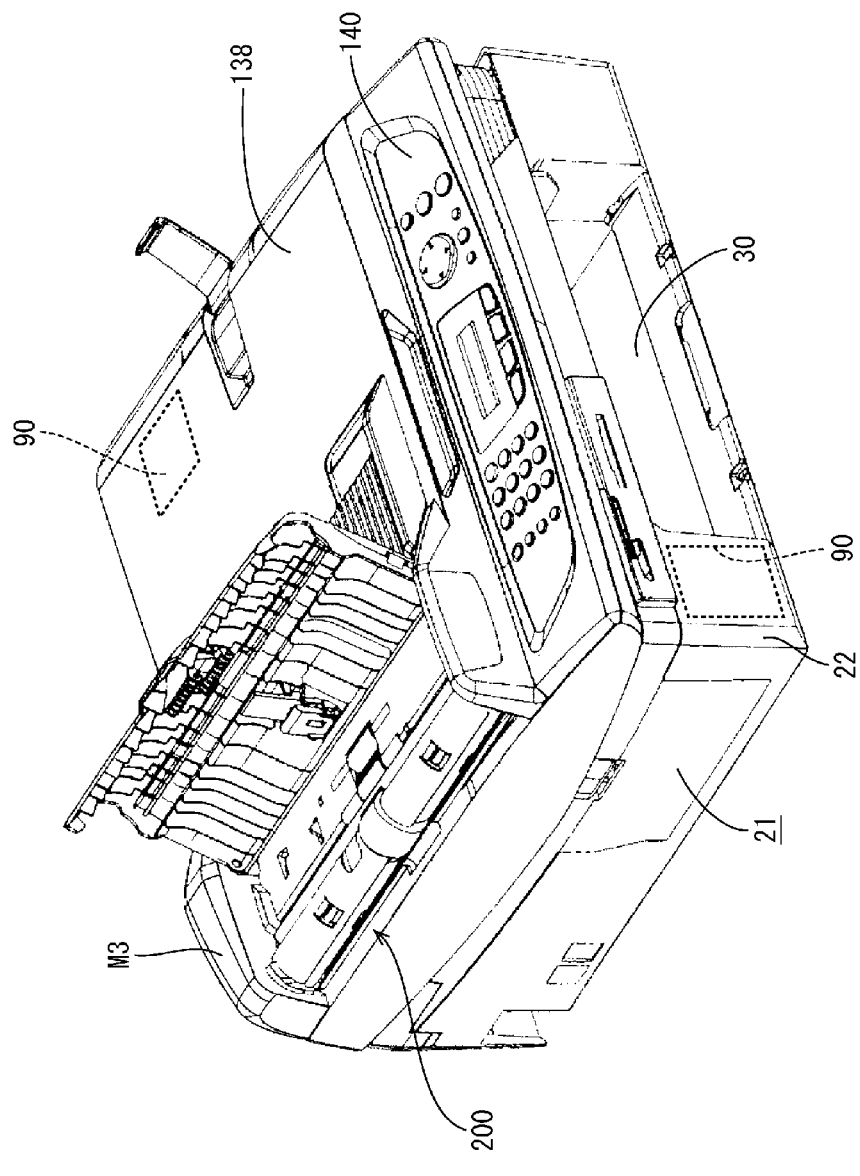
FIG. 9 is a perspective view illustrating a multi-function apparatus according to another embodiment.

(2) In the first and second embodiments, the multi-function apparatus 10 having the flatbed type scanner unit 130 has been exemplified. However, the multi-function apparatus 10 may be configured to include an ADF mechanism 200 as shown in FIG. 9. In this case, since an ADF motor M3 for conveying sheets also becomes a noise source, it is preferable to dispose the NFC board 90 on the front wall 22 of the main body case or an end portion of the document cover 138 which is on the opposite side to the installation position of the ADF motor M3 as shown in FIG. 9, such that the NFC board 90 is separated from the ADF motor M3.

(3) In the second embodiment, the NFC board 90 and the platen glass 131 have a positional relationship in which the entire NFC board 90 overlaps the platen glass 131 as seen from the above. However, at least the loop antenna 91 and the communication circuit need to overlap the platen glass 131, and thus a part of the board may be deviated from the platen glass 131.

In this configuration, the near field communication board is disposed to be apart from the power supply unit by the communicable distance or more. For this reason, a magnetic flux generated by a current flowing in the antenna mounted on the near field communication board does not interlink with the power supply unit and the leakage of the magnetic flux is small, and thus, a magnetic field generated by the antenna is suppressed from weakening. Therefore, it is possible to suppress the communication performance of the near field communication board from deteriorating. If the magnetic flux interlinks with the power supply unit, since the leakage of the magnetic flux increases, the magnetic field generated by the antenna weakens, and thus the communication performance of the near field communication board deteriorates.

Further, in this configuration, since the near field communication board is disposed on the outer peripheral wall of the housing, it is easy to bring a communication terminal close to the near field communication board and it is easy to perform operation.

In this configuration, since the near field communication board is provided on the front wall of the housing, it is easy to bring a communication terminal close to the near field communication board and it is easy to perform operation.

On the left side (left side as the image forming apparatus is seen from the front side), the near field communication board is disposed. In this configuration, since it is possible to operate an operation panel with a right hand while bringing a communication terminal close to the near field communication board with a left hand, the operability is good.

In this configuration, since the installation/removal opening for the ink cartridge is formed on the opposite side to the near field communication board, when the ink cartridge is installed or removed, the near field communication board does not become a hindrance.

In this configuration, the near field communication board is disposed to be apart from the control board by the communicable distance or more. For this reason, a magnetic flux generated by a current flowing in the antenna mounted on the near field communication board does not interlink not only with the power supply unit but also with the control board, and thus a magnetic flux generated by the antenna is further suppressed from weakening. Therefore, it is possible to suppress the communication performance of the near field communication board from deteriorating.

In this configuration, since the top cover is provided, it is easy to bring a communication terminal close to the near field communication board and it is easy to perform operation.

Since the platen glass is interposed between the near field communication board and the power supply unit, there are merits in which it becomes possible to attenuate noise from the power supply unit by the platen glass, and the near field communication board is unlikely to be influenced by noise.

According to the present disclosure, it is possible to suppress deterioration of the communication performance of the near field communication board for near field communication. Further, it is possible to improve operability.

The invention claimed is:

1. An image forming apparatus comprising:
an image forming unit;
a housing configured to store the image forming unit, the housing including an outer peripheral wall;
a power supply unit disposed inside the housing; and
a near field communication board including a loop antenna for near field communication, the near field communication board extending along a portion of the outer peripheral wall apart from the power supply unit by a diameter of the loop antenna or more.

2. An image forming apparatus comprising:
an image forming unit;
an image reading unit;
a housing configured to store the image forming unit and the image reading unit, the housing including an outer peripheral wall;
a power supply unit disposed inside the housing; and
a near field communication board including a loop antenna for near field communication, the near field communication board extending along a portion of the outer peripheral wall apart from the power supply unit by a diameter of the loop antenna or more.

3. An image forming apparatus comprising:
an image forming unit;
an image reading unit;
a housing configured to store the image forming unit and the image reading unit;
a power supply unit disposed inside the housing; and
a near field communication board including a loop antenna for near field communication, the near field communication board being disposed to a side of the image reading unit and apart from the power supply unit by a diameter of the loop antenna or more.

* * * * *